J. Rust.
Melt Raiser.
9293X
Patented Dec. 16, 1835.
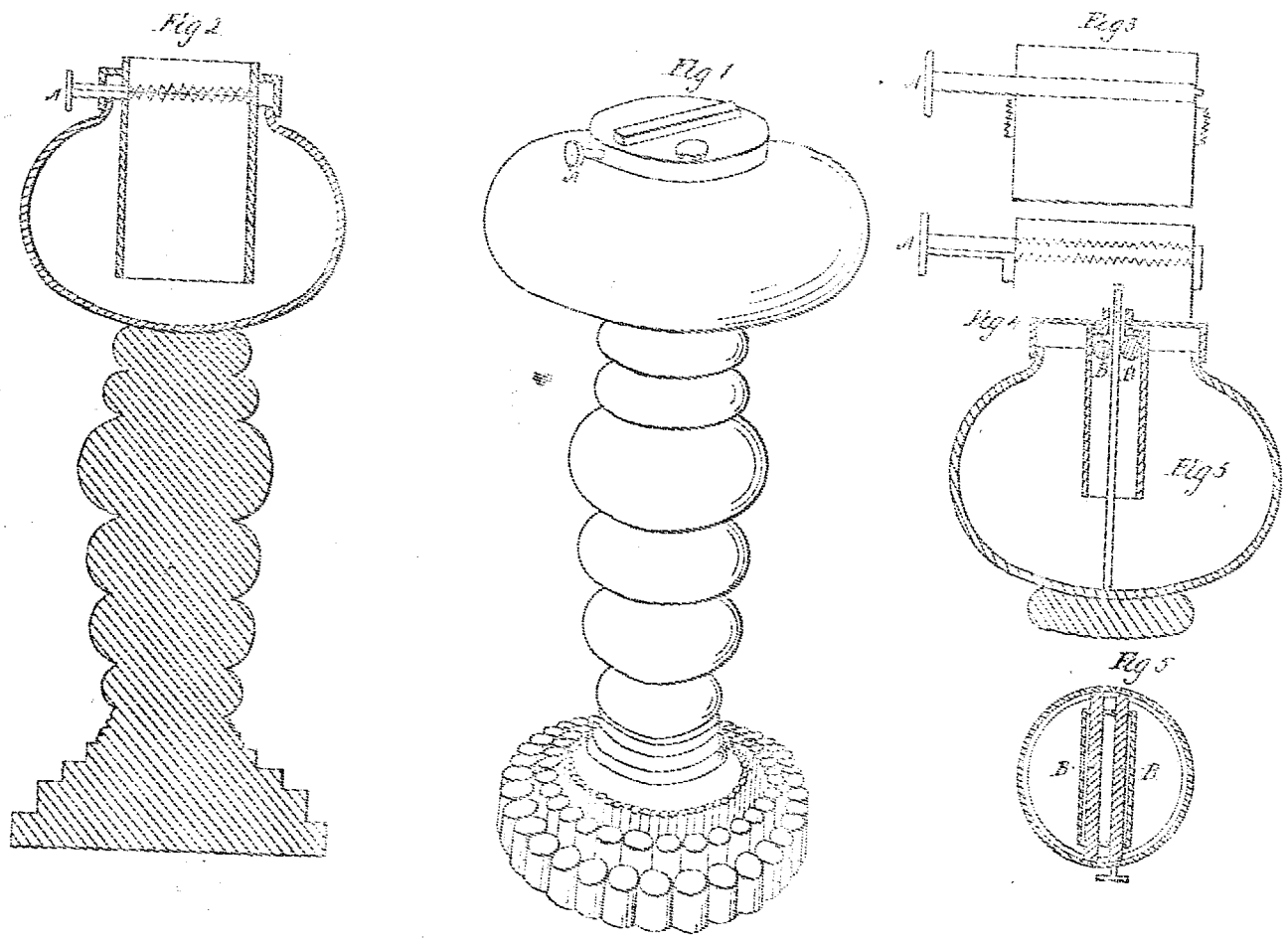

Oct. 6. 1835

Samuel Rust, of New York, Refused Dec. 16. 1835

Letters Patent 9293X

The schedule referred to in these Letters Patent, and making part of the same, containing a description, in the words of the said Samuel Rust himself, of his improvement in the lamp, for which Letters Patent were granted, dated October 6th 1835, which letters patent are hereby cancelled, by order of the Secretary of State, having been prematurely issued.

---

To all to whom these presents shall come – Be it known that I Samuel Rust, in the City of New York, County & State of New York, have invented & brought into use, a new & useful improvement in the Lamp, for lighting houses, Stores, & all other places, & that the following is a full and correct description of the construction & operation of said improvement as invented or improved by me – The Tube or socket to receive the wick of said lamp is best calculated flat or square, but the vessel & body, to hold the oil may be as other lamps. Into the tube or socket which receives the wick, a roller is inserted, for managing the wick (with the said tube or socket fixed or stationed to the lamp or made in, or inserted into a cap to the lamp, or into a screw or cork stopple, or into any other substance used as a stopple the same as a cork) which roller in all cases, is inserted into the said tube or socket in the lamp above the oil, & so near the Top of the lamp, as to prevent the oil from escaping at the journals of said roller, & make it the more convenient to receive & take in the wick, and to raise the wick without its crumpling, in case the wick is thin & limsy, and the said roller to be made a plane round roller, or to be made angular, or to have projections, bearings, cuts, grooves, indentations, corners, squares, pins, teeth, or other roughness, made or attached to it, and the said roller placed horizontally or nearly so, through & across the said tube or socket flatwise, & close on one side of the tube or socket, & just leaving room for the wick to pass on the other side, so that the roller may slightly press upon, & its angles, teeth, or other roughness, as made or attached to it, take hold of the wick. This roller should be a proper size & its teeth or angles executed smoothly (for if the roller is too small & the teeth or angles on it, rough or badly executed, it will hang in the wick, & roll the wick round it, particularly when the roller is inserted at the bottom of a short tube or socket as is hereafter mentioned). These teeth or angles should be long & sharp, for the purpose of suspending the wick with but little pressure so that the oil will have a free circulation to the blaze which will always produce a clear and splendid light. On one end of said roller, is a head or button, with which it is easily turned, & when turned it moves the wick either up or down, as required and beautifully regulates the light & by the same operation the old wick is taken out, and the new put in, which is done in a moment, as it were, without dirt or trouble, obviating the present inconvenient mode attending other lamps –

This roller inserted above the oil, or at or near the top of the lamp as aforesaid, is also used at the bottom of a short tube or socket, with the tube or socket made in, or inserted into a cap to the lamp, or into a screw or cork stopple, or other substance, used as a stopple the same as a cork, or said tube or socket, made stationary to the lamp, or to slip in vent of the lamp, independent of the stopple, and used as a stopple. Two rollers (as the one above described) can also be used at the bottom of this tube or socket, or inserted into the tube or socket with the wick passing between the rollers, but the one roller is more simple, & will answer all the purposes of the two, and consequently is better.

The one roller, tube & cap, with the screw & cork stopple, as first above described, are exhibited in the drawing accompanying this specification in figures two, three & four, with the roller marked A. and also the two rollers are exhibited in said drawings, in figures five, with the rollers marked B. –

My improvement does not consist in a stopple, or in a tube, or in a cap, but in the application and combination of a roller or of rollers, with the said tubes or sockets, cap and stopples, in or to the lamp as above set forth, or in any other way or manner that is essentially the same – or inserting any roller or rollers into any tube or socket of a lamp whatever that is made to receive the wick, with the said roller or rollers, operating & regulating the wick of a lamp on this principle, & for which I request Letters Patent – As witness my hand this twenty-eighth day of

3

9293x

November, one thousand eight hundred & thirty-five —

Witnesses

James Green

Herschel Camp

Samuel Rust (Drawing)

940. [illegible]